Figures 1, 2:
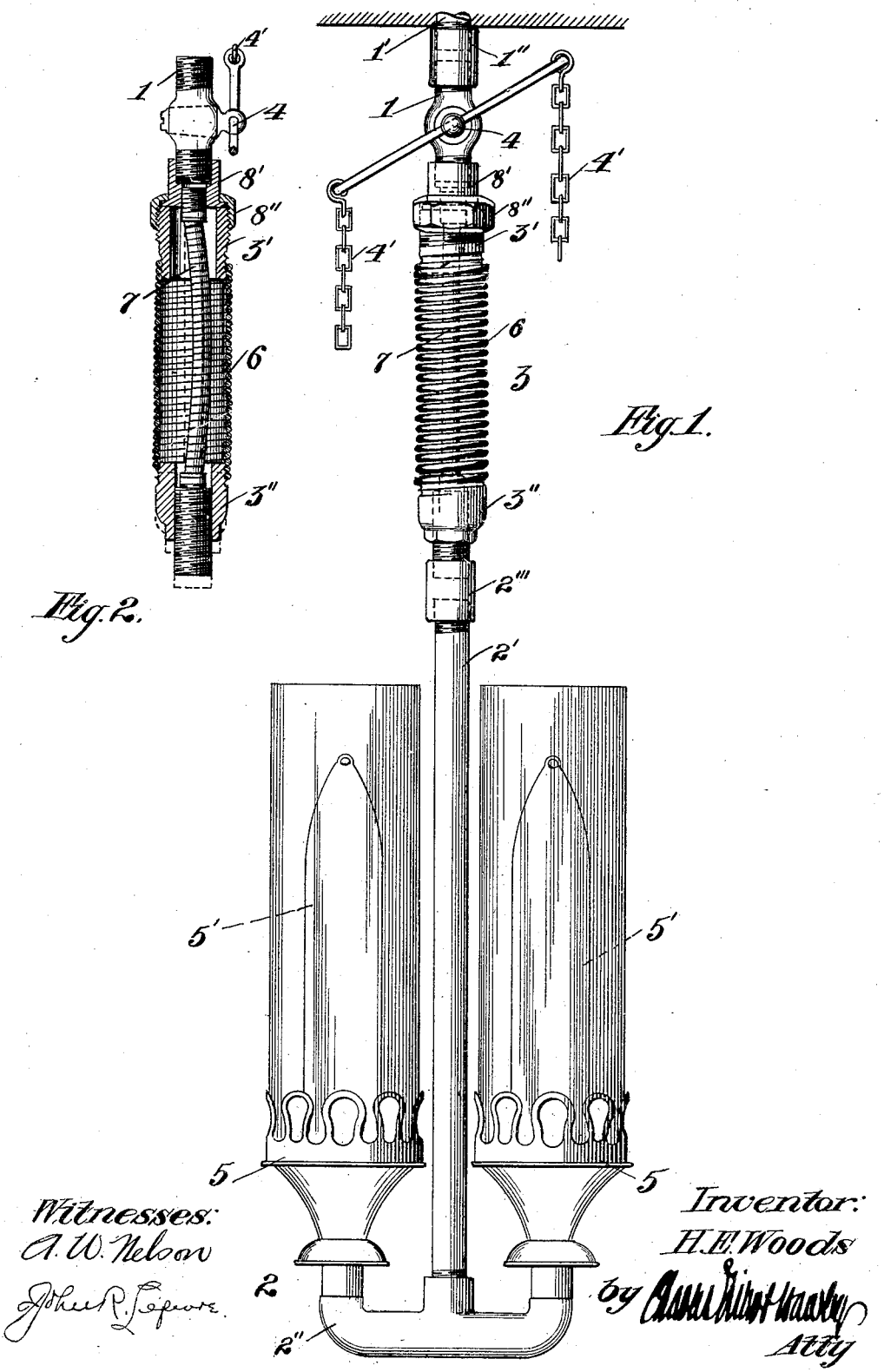

H. E. WOODS.
SHOCK ABSORBING DEVICE FOR GAS MANTLE FIXTURES.
APPLICATION FILED JAN. 25, 1908.

940,629.

Patented Nov. 16, 1909.

Witnesses:
A. W. Nelson

Inventor:
H. E. Woods
by
Atty

UNITED STATES PATENT OFFICE.

HARRY E. WOODS, OF CHICAGO, ILLINOIS.

SHOCK-ABSORBING DEVICE FOR GAS-MANTLE FIXTURES.

940,629. Specification of Letters Patent. Patented Nov. 16, 1909.

Application filed January 25, 1908. Serial No. 412,572.

*To all whom it may concern:*

Be it known that I, HARRY E. WOODS, a citizen of the United States, and a resident of Chicago, Cook county, Illinois, have invented a certain new, useful, and Improved Shock-Absorbing Device for Gas-Mantle Fixtures, of which the following is a full, clear, and exact description, such as will enable others skilled in the art to which it appertains to make and use the same.

The invention relates to improvements in gas fixtures and has particular reference to fixtures of the type that use gas mantles. Fixtures of this kind are much used in factories, stores, and like places and are usually rigidly connected to a gas pipe in the ceiling. The ceilings in buildings of this kind are subject to shocks and jars of many kinds, caused by the handling of heavy boxes, operations of machines, and by other causes on the floors above. The gas fixtures being rigidly connected to the ceiling, such shocks are transmitted through the fixtures to the mantles, causing them to break and rendering it difficult to maintain the lamps in working condition.

The object of the invention is to provide a gas fixture of such construction that it will absorb jars and shocks communicated from above and thereby prevent the breakage of mantles.

The invention consists generally in a gas fixture comprising an upper rigid member, a lower rigid member and an intermediate flexible member, all in substantial alinement, said intermediate member being elastic and serving to prevent the communication of injurious shocks from the upper to the lower rigid member.

My invention further consists of an intermediate member of peculiar and novel construction, and also in various details of construction and combinations of parts, all as hereinafter described and particularly pointed out in the appended claim.

The invention will be more readily understood by reference to the accompanying drawings forming a part of this specification, and in which—

Figure 1 is a gas fixture embodying my invention, shown connected to a gas supply pipe in the ceiling; and Fig. 2 is a section through the intermediate or shock absorbing member of the fixture.

Now referring to Fig. 1, 1 is an upper rigid member, 2 a lower rigid member, and 3 an intermediate flexible member, the latter constituting the shock absorbing device and comprising a flexible, elastic portion for supporting the lower member of the fixture and a flexible pipe for the passage of gas therethrough. The upper rigid member 1 is connected to a gas supply pipe 1' by a coupling 1'', and contains a gas cock or valve 4.

4'—4' represent the chains for operating the gas cock or valve.

The lower rigid member 2 comprises a vertical pipe member 2' and a cross pipe member 2'', to which are secured one or more burners 5—5, said burners containing mantles 5'—5'.

The intermediate member 3 comprises upper and lower heads 3'—3'' connected by a coiled spring 6, which supports the lower member 2 of the fixture. A coupling 2''' connects the intermediate member 3 to the lower member 2. The upper head 3' has a flanged sleeve 8' secured thereto by a threaded union 8'', said flanged sleeve being tapped to receive the upper rigid member 1 of the fixture. A flexible tube 7 connects the upper and lower head and forms a passage for gas through the shock absorbing member 3. The normal condition of the member 3 before the fixture is hung is that shown by full lines in Fig. 2. The flexible tube 7 is compressed and slightly bowed by the pressure of the spring 6, but when the fixture is hung the weight of the lower member 2 elongates or distends the spring and partially straightens the tube 7, enough slack being retained to permit further distension of the spring. When the fixture is subjected to a shock or jar from above, the spring 6 is compressed and the tube 7 slightly bowed, the parts assuming substantially the positions shown by the full lines in Fig. 2. The blow or shock is received and taken up by the spring and in this manner the shock is prevented from injuring the mantles on the lower part of the fixture.

Attention is called to the fact that the valve for governing the flow of gas to the fixture is conveniently located in the upper member of the fixture. Thus located it may be operated freely and any shocks which are communicated to the upper part of the fixture in working the valve are taken up by the absorber and cannot injure the mantles.

A fixture constructed in accordance with the above description successfully accomplishes the object of the invention, but as numerous modifications will readily suggest themselves to one skilled in the art I do not limit my invention to the specific constructions and combinations of parts herein shown and described.

Having thus described my invention, I claim as new and desire to secure by Letters Patent:

A gas fixture comprising an upper pipe section, in combination with a lower pipe section, a gas mantle fixture on said lower section, a helical coiled spring having its ends fastened to and connecting said upper and lower pipe sections, said pipe sections and spring having a common vertical axis, a laterally flexible armored tube joining the ends of said pipe sections within said coiled spring, the length of said tube being greater than the normal length of said spring and being normally flexed within the spring, said spring and tube together forming a longitudinally elastic and laterally flexible connection and shock absorber between said pipe sections, substantially as described.

In testimony whereof, I have hereunto set my hand, this 18th day of January, 1908, in the presence of two subscribing witnesses.

HARRY E. WOODS.

Witnesses:
JOHN R. LEFEVRE,
A. W. NELSON.